United States Patent [19]

Schittek

[11] 4,019,532
[45] Apr. 26, 1977

[54] FLAP VALVE

[75] Inventor: Friedrich Schittek, Bremen, Germany

[73] Assignee: Gustav F. Gerdts KG, Bremen, Germany

[22] Filed: May 28, 1975

[21] Appl. No.: 581,462

[30] Foreign Application Priority Data

June 7, 1975 Germany .......... 2427577

[52] U.S. Cl. .......... 137/527
[51] Int. Cl.² .......... F16K 15/02
[58] Field of Search .......... 137/527, 527.2, 527.4, 137/527.6, 527.8; 251/298, 299

[56] References Cited

UNITED STATES PATENTS

| 2,827,921 | 3/1958 | Sherman et al. | 137/527 |
| 3,023,774 | 3/1962 | Schuller | 251/298 X |
| 3,658,293 | 4/1972 | Gaebel | 251/298 X |
| 3,804,124 | 4/1974 | Finke et al. | 251/298 X |
| 3,847,373 | 11/1974 | Hagar | 251/298 |

Primary Examiner—William R. Cline
Attorney, Agent, or Firm—Allison C. Collard

[57] ABSTRACT

A flap valve, in particular a return flap valve, having a flat disc valve housing with an associated valve seat and a locking member which is actuated in a stroke and pivot movement by two control levers of different lengths, the control levers being pivotably mounted with one of their free ends on the valve housing and with the other free ends on the locking member, and the pivot axes of both control levers being arranged parallel with respect to each other. The two control levers are articulated with one of their ends at the front face of the surface side pointing to the valve seat and with their other ends within the cross section of the valve flowthrough channel at the inlet side in front of the valve seat on the valve housing.

7 Claims, 5 Drawing Figures

FLAP VALVE

The present invention relates to a flap valve having a valve housing with an associated valve seat and a locking member which is actuated in a stroke and pivot movement by two control levers of different lengths. The control levers are pivotably mounted with one of their free ends on the valve housing and with the other of the free ends on the locking member. The pivot axis of both control levers are arranged parallel with respect to each other, so that the closing portion moves with its center substantially on the longitudinal axis of the valve housing or the adjacent coupled pipe line due to the control lever, during the opening and closing movement.

In the known embodiments of the aforementioned flap valves, the pivot axis at the housing side for the long control lever is mounted in a radial receiving dome of the valve housing outside of the flowthrough channel. Accordingly, the valve housing is rather large, and expensive and an additional part is provided along the body of the housing structure for mounting the control lever.

It is, therefore, an object of the present invention to provide a flap valve which is characterized by a very simple and especially small valve housing.

In the invention, the control levers are articulated with one of their ends at the front face of the surface pointing to the valve seat and with their other ends within the cross section of valve flowthrough channel at the inlet side in front of valve seat of the valve housing.

In accordance with this teaching, the control levers are provided at the influx side of the valve housing at the inside thereof in the flowthrough channel for the valve seat, so that no additional housing structure length is required. Furthermore, the fulcrums for the control levers are all within the cross-sectional area of the valve seat, so that the hitherto required receiving dome for the control levers at the housing side is eliminated.

It is an object of the present invention to provide a flap valve particularly for an advantageous constructive embodiment and for a very exact movement of the center of the locking member on the housing or pipeline longitudinal axis during the opening and closing movement of the locking element.

It is a further object of the present invention to provide a flap valve particularly for an advantageous control lever arrangement taking into consideration the short length of the housing. With this arrangement, a continuous pivot axis for the short lever which would disadvantageously interfere with the long control lever can be eliminated.

It is also an object of the present invention to provide a flap valve particularly for a simple embodiment for the short control lever.

It is still a further object of the present invention to provide a flap valve wherein the control levers can be arranged in one plane, so that they are located in a particularly short longitudinal section of the housing.

It is yet another object of the present invention to provide a flap valve wherein the spring arrangement makes it possible to keep the increase of the locking effect of the spring onto the locking element low during the opening movement of the locking element, or to even obtain a decrease of the locking effect, as is commonly advantageous in flap valves.

It is another object of the present invention to provide a flap valve particularly with another simple spring embodiment.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views.

Figure 1:
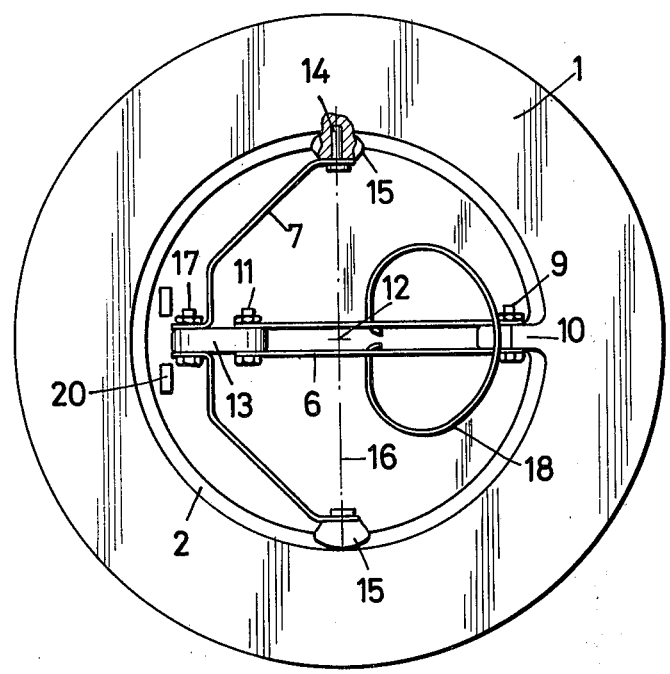
FIG. 1 is a top plan view of a return flap valve in a closing position.
Figure 2:
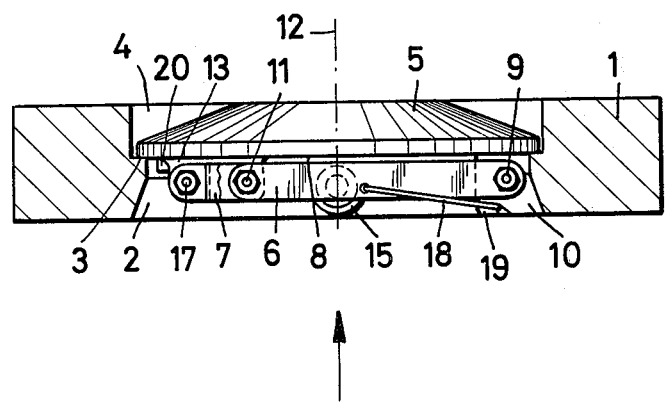
FIG. 2 is a part longitudinal section of the return flap valve of FIG. 1 in a closed position.
Figure 3:
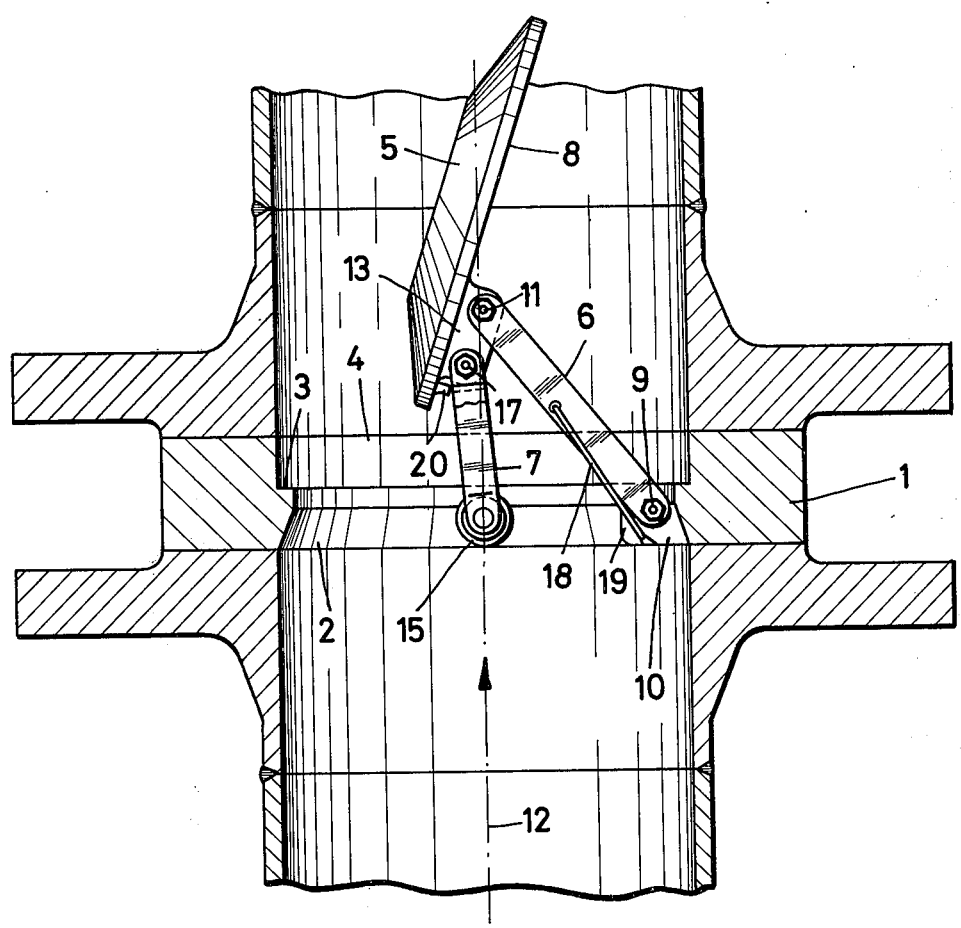
FIG. 3 is a view of the return flap valve of FIG. 1 between two pipeline flanges in open position and partly in a sectional view.

Referring now to FIGS. 1–3, according to the invention, a flat disc-like valve housing 1 is provided with an inlet flowthrough channel 2, which has an outlet opening in a valve seat 3, as well as an adjacent outlet channel 4. A locking member 5 or valve disc is provided in the latter (FIGS. 1 and 2) which is held by a long control lever 6 and a short control lever 7. These two control levers are articulated with one of their ends at the front face 8 of the locking element 5, which faces valve seat 3, and with their other ends within the flowthrough channel 2 on the valve housing 1. (Herein, "short" and "long" refer to the axial distance between the articulate points for the control levers.) The long control lever 6, which consists of a pair of parallel running levers, is pivotably mounted on a pivot axis 9 on the housing side, whereby this pivot axis is held in close proximity in a housing rib 10 and in a tangential direction with respect to the wall of the flowthrough channel 2. The mounting of control lever 6 at the locking element is achieved by means of a pivot axis 11, which in a closed position of the valve, is held in a rib 13 of the locking element at a distance beyond the longitudinal axis 12 of the flowthrough channel 2 or locking element 5, respectively.

The short control lever also comprises a pair of levers and is in the form of a yoke. Both ends of the yoke are provided with axial extensions 14 which are held in diametrically opposite bearings 15 on the center or diameter line 16 of the flowthrough channel 2 on the valve housing 1. At the yoke apex, the control lever 7 is provided with a pivot axis 17 which connects the two levers, whereby the pivot axis is held in the locking element rib 13, at a larger distance with respect to the longitudinal axis 12 than the pivot axis 11 of the other control lever 6. The latter refers to the closed valve wherein the pivot axes 9, 11, 14, 17 of both control levers 6 and 7 are provided in one plane, thereby reducing the space for installation in a longitudinal direction.

The return flap valve according to the invention is also provided with a locking spring 18 which is in the form of an open wire ring and acts as a tension spring. This ring runs somewhat inclined toward the control lever 6, whereby both ring ends engage this control lever, whereby the ring is diametrically held on a hook 19, as seen in the direction of the medium flow at a distance in front of the pivot axis 9. Furthermore, abutment shoulders 20 are provided on locking element 5 which engage control lever 7 when reaching the desired opening position of the locking member 7.

The opening of the valve is carried out by the pressure of the incoming medium against the effect of the locking element 18. Thereby, the opening movement of the locking member 5 consists of a stroke and a pivot component, whereby the movement cycle is defined by control levers 6 and 7, whereby the center of the locking element 5 moves substantially on the longitudinal axis 12 of valve housing 1 and the subsequent coupled pipe line (FIG. 3), and moves into same. Together with control levers 6 and 7, the closing spring 18 is positively actuated. Thereby, the effective lengths of the lever arm is shortened as can be seen by comparing FIGS. 2 and 3, by which the locking spring 18 exerts a closing effect on the control lever 6 which transmits this effect onto the locking element 5. The increase in the spring force, caused by extending the length of the spring during the opening of the valve, is reduced or at least compensated in its effect on the locking element 5. Accordingly, the closing effect, caused by the spring onto the locking element 5, increases only slightly or even decreases during the opening movement, which is advantageous for eliminating partly open positions of the locking member 5.

As can be seen from the drawings, the valve housing is rather small and simple in its construction. The length of the housing can be kept to a minimum. The lengths are merely defined by the thickness of the locking member 5 and the length of the flowthrough channel 2 of valve seat 3. Other than at an outlet arrangement of the control lever, the lever does not require an extended longitudinal housing structure. Furthermore, no special receiving spaces or domes at the housing are required for receiving the fulcrums for control levers 6 and 7.

While only one embodiment has been shown and described, it will be obvious to those skilled in the art that many changes and modifications may be made thereunto without departing from the spirit and scope of the invention.

What is claimed is:

1. A flap valve and in particular a return flap valve comprising:
    a flat disk-like valve housing having inlet and outlet openings along its longitudinal axis defining a flowthrough channel;
    a valve seat formed in said housing and surrounding said outlet opening;
    a valve disk disposed on said valve seat for closing and sealing the output opening, said disk having pivot axis means projecting toward the input opening and offset from the valve axis;
    a first control lever having its ends pivotably coupled to diametrically opposite portions of said housing in the inlet opening and its center portion pivotably coupled to said pivot axis means; and
    a second control lever having one end pivotably coupled to said pivot axis means, and its opposite end pivotably coupled to said housing in close proximity with respect to a wall of said flowthrough channel at the inlet opening, the pivot axes of both control levers being arranged parallel to each other so that when said valve disk is closed on said valve seat, both control levers be in the same plane which is perpendicular to the valve axis, and when said valve disk is opened, said first control lever displaced said disk apart from said valve seat and said second control lever maintains the disk in a nonperpendicular position with respect to valve axis.

2. The flap valve according to claim 1 wherein
    said first control lever comprises a yoke having two yoke ends with axial extensions;
    bearings oppositely located at said valve housing and holding said yoke ends; and
    said pivot axis means comprising a rib projecting from said valve disc and pivotably coupled to the apex of said yoke.

3. The flap valve according to claim 1 further comprising a locking spring having one end engaging said second control lever, and having its other end secured at said valve housing adjacent the pivot axis of said second control lever on said valve housing.

4. The flap valve according to claim 3 wherein said spring constitutes a wire ring wherein the ends joined to said housing and said second control lever are diametrically opposite each other.

5. The flap valve as recited in claim 1 wherein the pivot axis of said first control lever in said pivot axis means is at a greater distance with respect to the axis of the housing than the pivot axis of said second control lever in said pivot axis means when said valve disk is closed on said valve seat.

6. The flap valve as recited in claim 1 wherein the pivot axes of said control levers are displaced the same distance from the valve seat when taken along the axis of the valve housing.

7. The flap valve according to claim 1 wherein said valve disk is formed with abutment shoulders adjacent to said first control lever for engaging said first control lever when the valve disc has reached the desired opening.

* * * * *